United States Patent
Billeter

[15] 3,669,224
[45] June 13, 1972

[54] AUTOMATIC DOUBLE ACTING SLACK ADJUSTERS

[72] Inventor: Henry R. Billeter, Deerfield, Ill.
[73] Assignee: Sloan Valve Company, Chicago, Ill.
[22] Filed: Dec. 21, 1970
[21] Appl. No.: 100,204

[52] U.S. Cl. ..........................................188/202, 188/196 D
[51] Int. Cl. .......................................................F16d 65/66
[58] Field of Search ......................................188/196 D, 202

[56] References Cited

UNITED STATES PATENTS

| | | | |
|---|---|---|---|
| 2,497,343 | 2/1950 | Carlbom | 188/202 |
| 3,177,985 | 4/1965 | Rauglas | 188/202 |
| 3,512,619 | 5/1970 | Rauglas | 188/202 |
| 3,520,387 | 7/1970 | Natschke | 188/202 |
| 3,593,826 | 7/1971 | Sander | 188/196 D |

Primary Examiner—Duane A. Reger
Attorney—Howard T. Markey, Alfred H. Plyer, Jr., James G. Staples and Daniel C. McEachran

[57] ABSTRACT

A slack adjuster of the double acting type for railway cars has three spin nuts arranged on a threaded rod. The spin nuts are variably operated to take up or let out slack in the brake rigging and have clutch surfaces cooperating with clutch surfaces adjacent the spin nuts to stop their rotation. The spin nuts are normally clutched to prevent unintended relative movements under operating conditions of vibration and shock. Economical standard tubular parts, and simple spin nuts are employed and arranged for ease of assembly and reliable operation.

19 Claims, 7 Drawing Figures

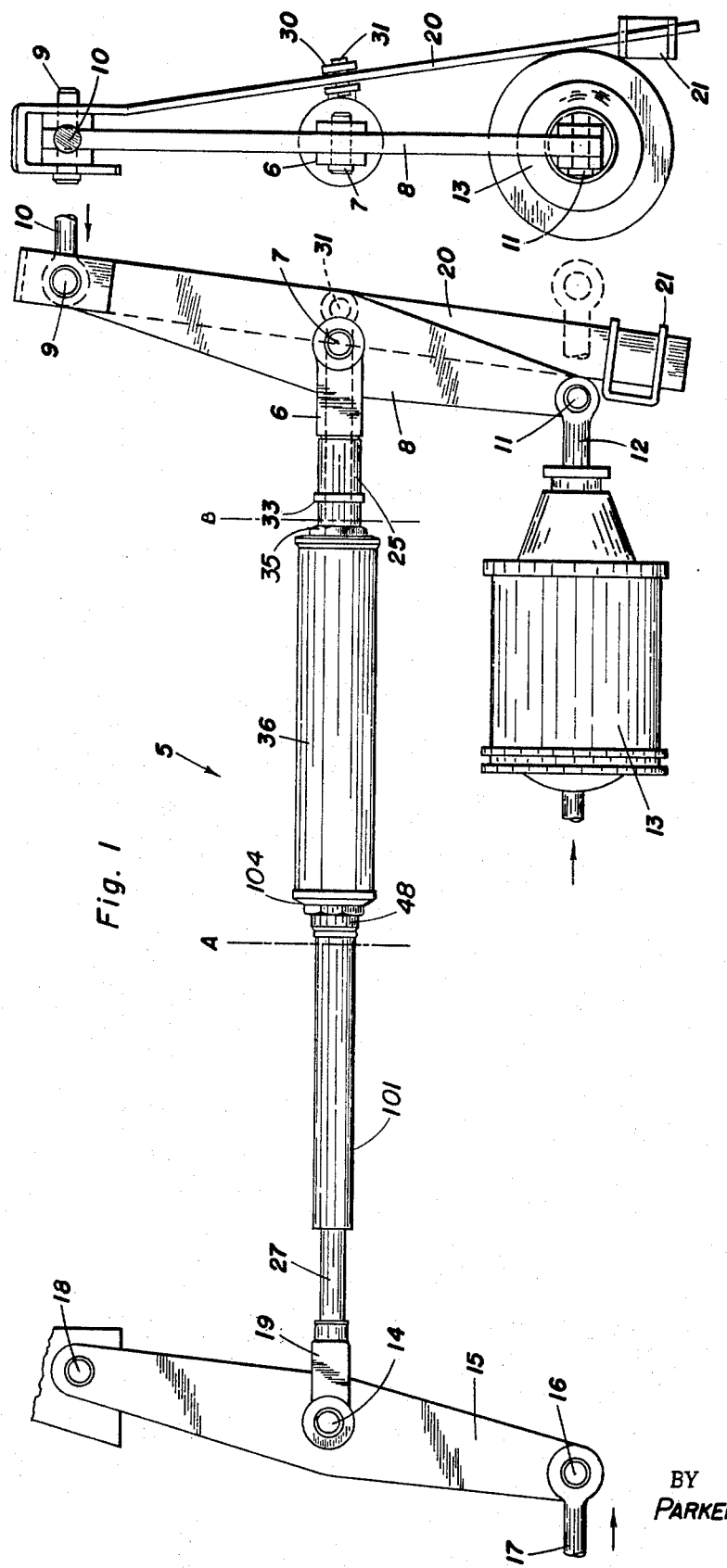

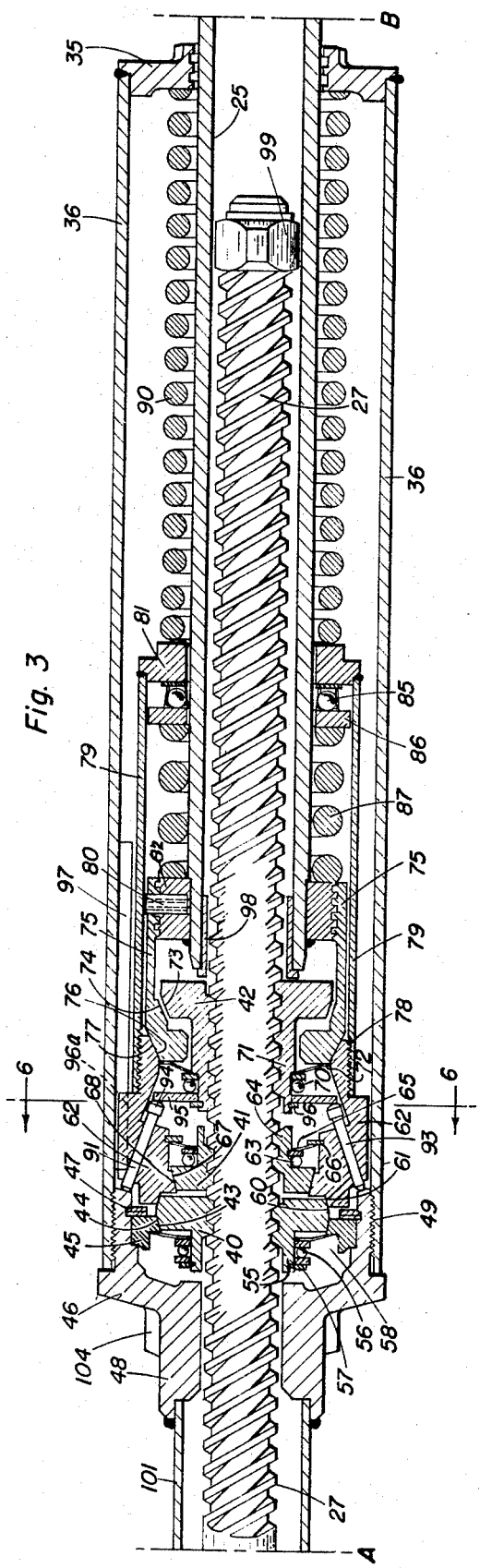
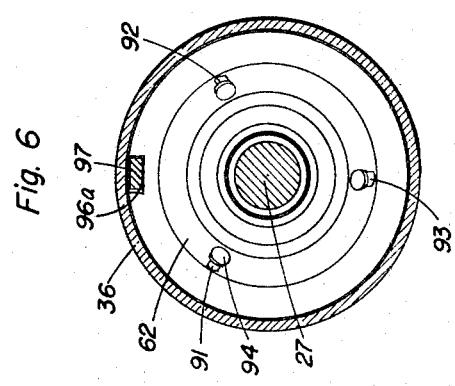
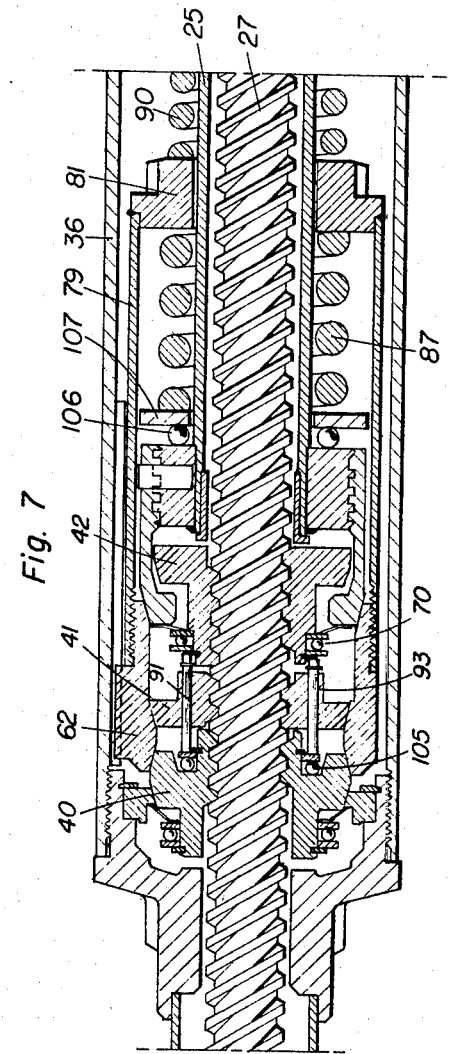
INVENTOR
HENRY R. BILLETER
BY
PARKER, CARTER & MARKEY
ATTORNEYS

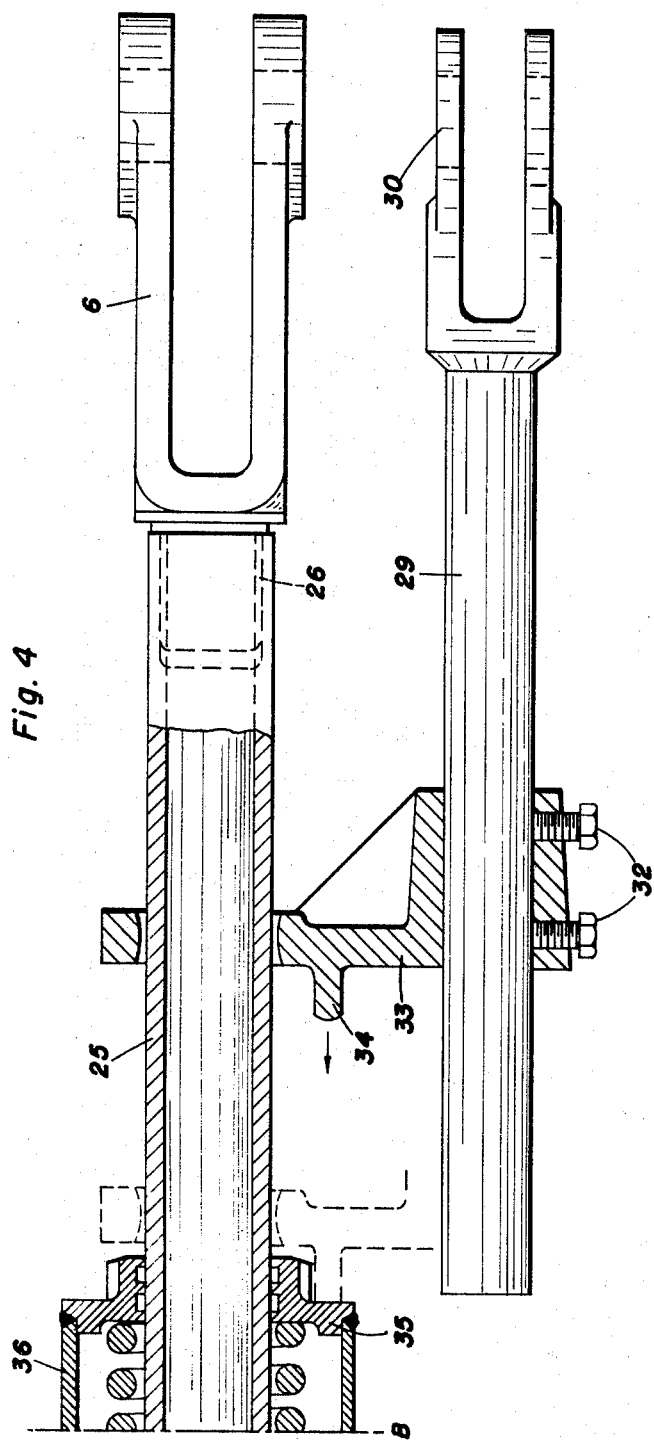
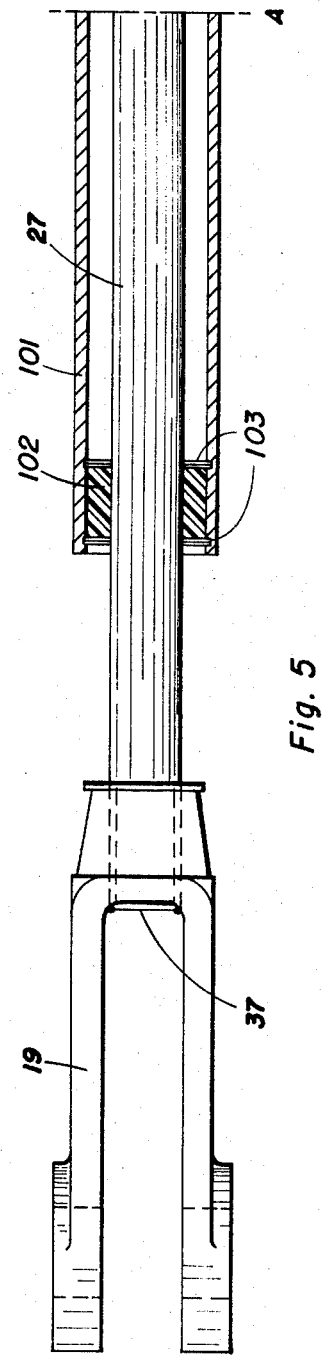

AUTOMATIC DOUBLE ACTING SLACK ADJUSTERS

BACKGROUND OF THE INVENTION

The invention is concerned with a new and improved type of automatic double acting slack adjuster for railway cars which is arranged and operative to either reduce or increase the slack in the braking system in order to provide optimum brake cylinder piston stroke for the car wheels at all times. The slack adjuster uses fewer parts which are compactly constructed to fit in all types of installations on railway cars.

An object of the invention is to design a new and improved slack adjuster in which the housing and operating elements are in the form of simple tubes which are arranged in telescoping relationship, and in which undesirable friction forces in the operation of the device are greatly reduced and false adjustments due to shock and vibration under service conditions, as well as false take up resulting from stretching the trigger mechanism, are eliminated.

A further object is to eliminate the large main spring usually required in slack adjusters so that the weight and bulk of the device is greatly reduced.

Another object of the invention is to design a new and improved double acting automatic slack adjuster which is relatively simple and rugged in construction, protected from entry of dirt and the weather, is positive and reliable in operation, and in which the operating characteristics are constant, and not affected by false screw extension.

An important object is to provide an automatic double acting slack adjuster of the threaded rod and spin nut type which positively locks the threaded rod against any undesired adjusting movement tending to occur as a result of excessive car vibration, shocks due to car switching impacts, uneven roadbed, and similar extraneous stresses and forces.

Another object is to reduce the tendency of the threaded rod to bend due to bending loads applied during operation of the slack adjuster, and this is accomplished by the elongated tubular housing guiding and supporting the threaded rod at critical points.

With the foregoing and other objects in view, the invention consists in certain novel constructions, combination, operation, and arrangement of parts described and illustrated hereinafter in the accompanying drawings and pointed out in the appended claims.

BRIEF DESCRIPTION OF THE DRAWINGS

FIG. 1 is a plan view illustrating part of a typical brake rigging arrangement on a railway car together with the slack adjuster of the invention;

FIG. 2 is an end view of the right hand side of FIG. 1 showing the trigger mechanism;

FIG. 3 is an enlarged cross-sectional view of the center portion of the slack adjuster taken between the points A and B of FIG. 1;

FIG. 4 is a sectional view of the right hand end of the slack adjuster;

FIG. 5 is a sectional view of the left hand end of the device;

FIG. 6 is a cross-sectional view taken along the line 6—6 of FIG. 1; while

FIG. 7 is a modification of the slack adjuster of the invention.

The improved automatic double acting slack adjuster of the present invention is adapted for installation in the brake rigging of a railway car and connected in the usual position between the brake cylinder and brake shoes and specifically as a center rod connection between the live lever and dead lever as shown in FIG. 1. The slack adjuster is equally applicable to top rod installation as is understood. When so installed the slack adjuster will automatically take up excess slack due to brake shoe wear and brake rigging wear, and let out slack when new brake shoes are installed. This action will automatically maintain the travel of the brake cylinder push rod within the limits prescribed by railroad practice regulations. The slack adjuster is adapted to take up slack to at least nineteen inches if necessary.

DETAILED DESCRIPTION OF THE INVENTION

The slack adjuster indicated generally at 5, comprises a unitary structure including a dirt and weather-proof casing or housing connected at the right hand end by the jaw or clevis 6 and pivot pin 7 to the center portion of the live or cylinder lever 8. The upper end of live lever 8 has a pivot pin 9 for connection to a portion of the brake rigging and linkage 10 leading to the brake shoes (not shown) in the customary manner. The bottom end of live lever 8 is pivoted by pin 11 to the moveable end of push rod 12 of the brake cylinder 13, which has a piston therein responsive to the usual brake control device of the railway car upon an air brake application. The left hand end of the slack adjuster 5 is provided with a supporting jaw or clevis 19 pivoted by pin 14 to the mid-portion of dead lever 15. This dead lever 15 in turn is pivoted by pin 16 at its lower end to another portion 17 of the brake rigging leading to the brake shoes on another truck of the railway car. Additionally, adjacent to live lever 8 (FIG. 2) there is an actuating lever 20 which is also pivoted at its upper end by pin 9 and has its lower end loosely slidable and pivoted in a slot formed in a bracket 21 supported on the railway car frame.

The general arrangement of the foregoing braking elements are well known and is such that outward projection of push rod 12 by operation of the brake cylinder 13 during a braking operation, results in the pivoted movement of levers 8 and 15, together with the axial movement of the slack adjuster 5, so that braking forces are applied to the linkages 10 and 17 in the direction indicated by the arrows, thereby producing an application of the brakes to the car wheels.

The slack adjuster is conveniently made up of a series of elongated tubes or housings, some of which are suitably joined together as by welding or threading into a single unitary structure, and with others of the tubes arranged to telescope relative to one another. The entire length of the device is such that the internal operating parts are all protected and enclosed to prevent damage by the weather, flying stones and other possible adverse effects. The slack adjuster of the invention as illustrated in FIG. 3 shows the parts in the normal running position of the car with the brakes in the off condition. The slack adjuster 5 includes a tubular pull rod 25 arranged within the device for longitudinal movement and has its right hand end extending outward for threaded engagement 26 with the jaw 6. A threaded rod 27 is telescopically and axially disposed within the pull rod tube 25 for longitudinal shifting movement relative to the tube, and for a substantial portion of its length is provided with non-self-locking threads having a high helix angle upon which a series of three spin nuts are adapted to be rotated, as will be pointed out hereinafter.

A trigger or sensing arrangement is controlled by actuating lever 20 and includes a trigger rod 29 (FIG. 4) arranged alongside the slack adjuster body having at one end a clevis 30 secured by pivot pin 31 to the actuating lever 20. The trigger rod 29 is clamped by locking screws 32 to a slidable bracket 33 loosely surrounding the pull rod 25. A projecting lug 34 on bracket 33, under certain conditions of operation, is adapted to engage an end cap 35 suitably secured as by welding to the right hand end of a trigger tube housing 36. The end cap 35 surrounds and is in sliding and sealing engagement with the pull rod tube 25. The trigger bracket 33 and its projecting lug 34 are normally spaced apart from collar 35 as shown and are adapted when contacted by projecting lug 34 to shift the trigger tube 36 to the left after the push rod 12 has been extended a distance of between 6 to 8 inches. The locking screws 32 enable the trigger rod 29 to be adjusted the proper amount in accordance with the particular installation, while the relative looseness of the bracket 33 around the pull rod 25 prevents binding of the parts due to any misalignment that may occur in the installation. The movement of the trigger lever 20 in relation to the clevis 6 is so designed as to be proportioned to the travel of the brake cylinder piston and its push rod 12.

The threaded rod 27 carries in threaded engagement therewith, a series of three spin nuts consisting of a take-up spin nut 40, a let-out spin nut 41 and a lock-up spin nut 42, all arranged in order on the threaded rod 27 and freely rotatable thereon under certain conditions of operation to either take up or let out slack. The take-up spin nut 40 has a peripheral clutching surface 43 on one side normally in cooperative clutching engagement with a clutching surface 44 formed in a ring member 45. The ring member 45 is supported in position in the housing 46 by the snap ring 47. The housing 46 has a shank portion 48 surrounding a portion of the threaded rod 27 and thereby serves as a guide and bearing for the rod at that point. The outer annular portion of housing 46 is threaded at 49 into the left hand end of the trigger tube 36. The shank portion 55 of spin nut 40 carries a thrust bearing 56 between supporting washers which are held in place by a snap ring 57 and against a bowed spring washer 58. The outer edge of bowed washer 58 bears against the ring member 45 so that the bowed washer 58 tends to hold the spin nut 40 clutch surface 43 normally against clutch surface 44.

The take-up spin nut 40 has a second clutching surface 60 arranged on the opposite side from its clutch surface 43, which is normally in cooperative engagement with a clutch surface 61 formed around the left hand end of a tubular traction sleeve 62. The let-out spin nut 41 has a thrust bearing 63 together with an associated supporting washer arranged on its shank portion 64. A bowed spring washer 65 held in place by snap ring 66 normally urges the clutch surface 67 of spin nut 41 into engagement with clutch surface 68 also formed on the end of traction sleeve 62.

The lock-up spin nut 42 carries a thrust bearing 70 with its supporting washers on the shank portion 71 together with a bowed spring washer 72. The lock-up spin nut 42 has a clutching surface 73 normally spaced apart from but in cooperative engagement with a clutch surface 74. This clutch surface 74 is formed on a clutching sleeve 75 the left hand end of which is extended inward behind the spin nut 42 as shown, where the bowed spring washer 72 engages and presses against the outside of it. The end of sleeve 75 also has a second clutch surface 76 formed on it and arranged to be normally in engagement with a cooperative clutch surface 77 formed on the traction sleeve 62. The traction sleeve 62 is threaded at 78 into the end of the tubular housing 79 enclosing a number of the operating elements of the slack adjuster.

The clutching sleeve 75 is threaded onto a bushing 82 around the left hand end of the pull rod tube 25 and held thereto by a locking pin 80 and by welding around the end of the tube 25 as shown for a more secure support. The right hand end of housing tube 79 is suitably attached as by welding to an end cap 81 arranged around and in slidable engagement with the pull rod tube 25. A thrust bearing 85 rests against the end cap 81 with its associated washers including a larger washer 86. Surrounding the pull rod 25 is a let-out spring 87 extending between the washer 86 and the bushing 82 of clutching sleeve 75, so that clutches 76 and 77 are normally held in engagement with each other due to the tension of spring 87. The let-out spring 87 has a compression force of 1,200 pounds.

A trigger spring 90 also surrounds the pull rod tube 25 and extends between the end caps 81 and 35 normally tending to hold the clutches 43–44, and 60–61 in engagement with each other.

Referring now to the traction sleeve 62 this serves to also support two or more push pins 91, 92, and 93 (FIG. 6) which are each slidable back and forth in holes bored in the sleeve 62 and are retained by heads 94 engaging thrust washer 95. This washer is held in place by snap ring 96 mounted on spin nut 41. The other end of the push pins 91–93 are normally in contact with the end of housing 46 as shown. At one outer annular edge portion of the traction sleeve 62 there is a slotted keyway 96a in which the elongated key 97 is slidable (FIG. 6). The key 97 is welded to the inner side of trigger tube 36. This key 97 permits relative axial or longitudinal movement between trigger tube 36 and sleeve 62 while insuring that these parts will rotate together under certain conditions of operation. At the left hand end of pull rod tube 25 and located between its internal diameter and the outer surface of threaded rod 27, there is a bushing 98 for guiding the relative longitudinal movements of pull rod 25 and threaded rod 27. This bushing 98 also serves to prevent sagging or bending of the slack adjuster at its mid point due to its length. The spin nuts will also more accurately engage their clutching surfaces all around their periphery and not be "cocked" or twisted from their rotary positions when the clutch surfaces are in engagement and thereby cause possible false operation.

At the extreme right hand end of the threaded rod 27 a guiding bushing 99 is firmly attached which serves as a stop to prevent pull out of the rod 27. It is made hex-shaped so that in the assembly of the slack adjuster, the lubricant with which it is packed, can pass from one side to the other of the bushing 99. At the left hand end of the slack adjuster a tubular sleeve 101 is suitably welded to the shank 48 of housing 46. This sleeve 101 also supports a bearing 102 (FIG. 5) on its left end which is slidable along the rod 27 near its end, the bearing 102 being confined between the snap rings 103 recessed in the inside of the sleeve 101. The bearing 102 also serves to exclude dirt and moisture from entering the internal operating mechanism of the slack adjuster as the threaded rod 27 is pulled inward or outward at each brake application.

In order to facilitate the assembly of the left hand housing 46 on the end of trigger tube 36, a series of wrench flats 104 are formed on it, and the same provisions are made on the outside of end cap 35 as shown.

DESCRIPTION OF THE OPERATION

For reasons well understood in the art, the maximum stroke of the brake cylinder push rod 12 in response to a braking operation, cannot exceed 12 inches, and an optimum range of 7 to 9 inches is selected for the slack adjuster to make its automatic adjustment for abnormal slack conditions which may be present in the brake rigging linkage or brake shoes. When a brake application is made the push rod 12 is forced outward by air pressure in the brake cylinder 13 thereby activating the live lever 8. Since the upper end of the trigger lever 20 is pivoted at 9 and the lower end slidably restrained by the bracket 21, the levers 8 and 20 will separate angularly at their lower ends. The slack adjuster also being pivoted at one end to the center of live lever 8 by pivot pin 7, this angular separation movement of both levers will cause the midpoint of lever 20 to shift the clevis 30 and its rod 29 inward or to the left. This proportional movement is so calculated that the lower end of live lever 8 will be operated by the push rod 12 over a distance of between 7 to 9 inches before the trigger bracket 34 engages the end cap 35 of the trigger tube 36.

In the running condition of the railway car the slack adjuster parts are normally positioned as shown in FIGS. 1 and 3. When a brake application under normal slack conditions takes place, the pull rod tube 25 will tend to move out of the trigger tube 36 toward the right, and at the same time the threaded rod 27 will tend to move to the left, so as to create tension in the slack adjuster. The let-out spring 87, which has an applied force of about 1,200 lbs. will hold the parts in the position shown until such time as about 10 lbs. of air pressure is applied to the brake cylinder 13 and this force in turn to the braking system.

The path of this force extends from the pull rod tube 25 to the clutching sleeve 75 and bushing 82, let-out spring 87, traction tube 79 and 62, clutch surfaces 67 and 68, to the let-out spin nut 41, and then to the threaded rod 27. After the force of spring 87 has been overcome the frictional contact between clutch surfaces 76 and 77 of sleeves 62 and 75 is reduced to the effect that the traction sleeve 62, trigger tube 36, through keyway 96a and key 97, and the coupling nut 41, together with the take-up spin nut 40, will all revolve a small amount around the threaded rod 27 to let out some slack. This action will add only a slight amount of slack into the system because as soon as trigger projecting lug 34 engages the end cap 35 at the end of the trigger tube 36, further rotation of the slack adjuster is stopped and no more slack is let out. The continued force applied from the brake cylinder push rod will now further compress the let-out spring 87 so that the traction sleeve 75 will then move over to engage its clutch surface 74 with surface 73 on lock-up spin nut 42 and thus provide a stop and solid lock to the traction sleeve 75 and spin nut 42. At this time the housing 46 also moves to the left so that the head ends 94 of the push pins 91-93 are free of the thrust washer 95 with the result that the bowed spring washer 72 on spin nut 42 additionally urges the clutch surface 73 into engagement with the clutch surface 74. The slack adjuster is now fully locked up and the brakes are firmly applied to the car wheels through the linkage and the slack adjuster. The lock-up path extends through threaded rod 27, spin nut 42, sleeve 75 and pull rod 25.

Upon release of the brakes which occurs when the piston of the brake cylinder 13 restores, the trigger or actuator lever 20 causes the bracket 33 and its projecting lug 34 to move away and to the right from the end cap 35 and trigger tube 36. Tension is thereby removed from the slack adjuster, permitting the let-out spring 90 to expand and shift the trigger tube 36 to the right hand side. The spin nut 40 as a result is caused to be shifted to the right by engagement of the clutch surfaces 43-44 and this in turn moves the threaded rod 27 to the right or into telescoping relation with the pull rod tube 25. This action also shifts spin nut 41 away from clutch surfaces 67-68 and spin nut 42 from clutch surfaces 73-74. Both of the spin nuts 41 and 42 now rotate to complete the take up, after which the slack adjuster is locked up as has been pointed out.

Assume now that a brake application is made when there is an excess of slack in the braking system, which may occur on account of brake shoe wear or loss of a shoe. It is therefore necessary to take up this excess slack automatically by operation of the slack adjuster. The take-up action occurs as the braking action takes place and after the brake cylinder push rod 12 is extended beyond the limits of its permitted stroke. The trigger lever 20 then moves its bracket 33 so that projecting lug 34 engages the end cap 35 thereby causing the trigger tube 36 to shift or move the tube 36 to the left. Clutching surfaces 43-44 are accordingly separated permitting spin nut 40 to rotate and follow the clutch 44, the bowed spring washer 58 holding and urging the spin nut 40 close to the clutch surface 44. The threaded rod 27 is prevented from moving to the left by spin nut 41 engaging clutches 67-68 with clutch sleeve 62. This action all occurs during the initial portion of the braking movement and as soon as left hand ends of the push pins 91-93 are moved away from the housing 46. Spin nut 42 is thus permitted to engage clutch surfaces 73-74 so that the threaded rod 27 is now locked up to transmit the braking forces directly to the brakes. The trigger tube 36 will continue to shift to the left and the spin nuts rotate on the rod 27 to the extent that the amount of excess slack is taken up.

The actual take up therefore occurs upon the release of the brakes when the brake cylinder push rod retracts. The projecting lug 34 then moves away from the trigger tube 36 relieving tension from the slack adjuster and allowing trigger spring 90 to expand and shift trigger tube 36 to the right. Spin nut 40 is shifted to the right by engagement of clutch surfaces 43-44 which moves the threaded rod 27 to the right. This unseats clutch surfaces 67-68 and 73-74 of spin nuts 41 and 42, which thereby rotate to complete the take up of slack.

Assume a condition now in which the brakes are too tight as when new brake shoes are installed, so that it is necessary to let out a certain amount of slack to prevent locked or skidding wheels when the brakes are applied. When such insufficient slack exists, tension is present in the system which stress is applied to the slack adjuster before the trigger lever 20 moves the projecting lug 34 into contact with the end cap 35 of the trigger tube 36. This mounting tension tends to move the threaded rod 27 to the left but the rod is restrained by the spin nuts 40 and 41 because of their clutch surfaces 43-44 and 76-77 being in engagement and which are also being pulled to the left. When sufficient tension has mounted and reached a value of 1,200 lbs., the let-out spring 87 is compressed so that the frictional contact between clutch surfaces 76-77 is reduced, thereby permitting the spin nuts 40 and 41 to rotate around the threaded rod 27. Along with this action the traction sleeve 79 and trigger housing 36 are also axially rotated because of their connection with the keyway 96-97.

The foregoing elements will continue to rotate around the threaded rod 27 and pay out slack until the trigger lever 20 extends the projecting lug 34 into contact with the trigger tube 36 and shifts the tube 36 to the left. This action frees the push pins 91-93 and permits the spin nut 42 to shift clutch surfaces 73-74 into engagement to prevent further let out and lock up the slack adjuster so that the brakes can now be firmly applied. The release action of the slack adjuster takes place in the manner previously pointed out.

The problem of sudden shocks in train operation such as vibration, heavy coupling load, uneven roadbed, etc. may tend to place the slack adjuster in tension and this would be identical with an axial force being applied to the slack adjuster. However the 1,200 lb. let-out spring 87 would hold the parts locked up in their normal brakes released condition. Should the shocks tend to compress the slack adjuster the 150 lb. force of the trigger spring 90 tends to place the load upon the clutch surfaces 43-44 and 67-68 of spin nuts 40 and 41. The purpose of these clutch surfaces therefore is to prevent the threaded rod 27 from being pushed into the pull rod tube 25 during such a compressive type of vibration or sudden shock. The inward movement of the pull rod tube 25 is prevented by engagement of clutch surfaces 76-77, so that the combination of the foregoing clutch surfaces and the force of the trigger spring 90 prevents any collapsing of the slack adjuster due to the compressive type of load.

The guide bushing 98 around the threaded rod 27 at the end of the pull rod tube 25, prevents the whole slack adjuster from sagging in the middle, especially when extended and serving its purpose. This bushing 98 also prevents the spin nuts from being tilted or cocked from their full frictional contact all around their clutching surfaces and with the traction sleeve 75. The bushing 98 also serves another important function and that is to prevent the slack adjuster from coming apart. There is a second bushing 99 on the right hand end of the threaded rod 27 arranged so that in the event the rod 27 is pulled out to its full length the bushing 99 will engage bushing 98 and cause it to slide into contact with spin nut 43 and thereby apply a firm force through spin nut 42 and clutch surfaces 67-68 back to let-out spring 87 which would be compressed and cause the slack adjuster to lock up rigid.

An important problem to overcome in previous slack adjusters was false take up because of binding of the trigger rod. In the present arrangement this is solved because of the fail-safe feature incorporated in the device. The only time there can be any slack taken up is when the force is applied to the projecting lug 34 to overcome the compression of the trigger spring 90. In other words, when the trigger lug 34 has moved the trigger tube 36 inward a half inch for example, that is the amount of slack taken up. The device therefore never takes up more slack than is actually required by the position of the projecting lug 34.

An advantage in the present slack adjuster is the ease of installation. The threaded rod 27 can be manually rotated in or out of the housing tubes to properly adjust the length of the slack adjuster for a particular installation. This is possible because of the elimination of the former main spring. In previous types of slack adjusters the main spring could not be adjusted to provide for the effective length of the slack adjuster without the use of a wrench of some other special tool.

Another advantage in addition to the simple assembly of the parts is the ease and economy of machining the various parts such as the tubes, spin nuts, end caps or etc., which are simple and inexpensive to produce. There are also fewer parts employed than in former slack adjusters.

Referring now to the modification of the invention shown in FIG. 7, most of the elements included are the same as those in FIG. 3 with the exception that the push pins 91-93 are arranged to slidably pass through bores in the let-out spin nut 41. The push pins 91-93 at one end engage the thrust bearing 70 on spin nut 42 and at the other end press against a thrust bearing 105 arranged on spin nut 40. The push pins serve the same purpose in this modification as in FIG. 3 to lock up the spin nut 40 in normal position and to release the spin nut so it can revolve to take up slack. The let-out spring 87 has its left hand end engaging thrust bearing 106 and its associated washer 107 rather than as shown in FIG. 3 at the right hand end of the spring 87.

I claim:

1. In an automatic slack adjuster for railway car brakes, a pull rod tube connected to one portion of the braking system, a threaded rod arranged telescopically within said pull rod tube and connected to another portion of the braking system, a plurality of spin nuts spaced apart and arranged on said threaded rod for rotation thereon, said spin nuts comprising a take-up spin nut, a let-out spin nut and a lock-up spin nut, said let-out spin nut being located between said other two spin nuts, a clutching sleeve secured to the inner end of said pull rod tube and having a clutching portion thereon bent inwardly behind said lock-up spin nut, a traction tube surrounding said pull rod tube and having an end cap on one end in slidable relationship with said pull rod tube, the other end of said traction tube surrounding said spin nuts, cooperative clutching surfaces between said traction tube and said clutching sleeve, between said lock-up spin nut and said clutching sleeve, and between said traction tube and both said take-up and said let-out spin nuts, a trigger tube surrounding said traction tube having an end cap on one end in slidable relationship with said pull rod tube, a trigger spring around said pull rod tube extending between the end caps on said traction tube and trigger tube, a let-out spring around said pull rod tube and extending between said traction tube end cap and said clutching sleeve, a housing at the other end of said trigger tube from its end cap, said housing surrounding said threaded rod and having cooperative clutching surfaces with said take-up spin nut, bowed spring washers on each of said spin nuts for normally urging said spin nuts into engagement with the associated clutching surfaces, a cooperative slot and keyway between said trigger tube and said traction tube whereby said traction tube and said trigger tube are rotatable together around said threaded rod and are longitudinally slidable with respect to one another, and a plurality of push pins slidable back and forth in said traction tube and extending between said lock-up spin nut and said housing, said push pins operative to effect disengagement of said lock-up spin nut from its clutching surface with said clutching sleeve during slack take up of said slack adjuster.

2. In an automatic slack adjuster for railway cars, a pull rod tube connected to one portion of the braking system, a threaded rod arranged telescopically within said pull rod and connected to another portion of said braking system, a plurality of spin nuts arranged on said threaded rod adapted to be rotated thereon, said spin nuts comprising a take-up spin nut, a let-out spin nut, and a lock-up spin nut, a clutching sleeve on one end of said pull rod, cooperative clutching surfaces between said clutching sleeve and said lock-up spin nut, a traction tube around said pull rod tube having one end in slidable engagement with said pull rod tube and the other end around said spin nuts, cooperative clutching surfaces between said traction tube and said take-up and let-out spin nuts and between said clutching sleeve, a trigger tube surrounding said traction tube and having one end in slidable engagement with said pull rod tube, a housing around said threaded rod attached to the other end of said trigger tube, said housing having cooperative clutching surfaces with said take-up spin nut, a trigger spring between said trigger tube and said traction tube, a let-out spring between said traction tube and said clutching sleeve, both of said springs being around said pull rod tube, and a plurality of push pins slidably extending through said traction tube and being in contact at one end with said housing and at the other end with said lock-up spin nut, spring means on said lock-up spin nut for normally urging the lock-up spin nut clutching surface into engagement with said clutching sleeve during slack take up, said push pins operative to effect disengagement of said lock-up spin nut from its clutching surface with said clutching sleeve during slack let out.

3. In an automatic double acting slack adjuster for railway cars, a pull rod tube connected to one portion of the braking system, a threaded rod telescopically arranged within said pull rod tube and connected to another portion of said braking system, a plurality of spin nuts spaced apart and rotatable on said threaded rod to take up or let out slack in said braking system, said spin nuts comprising a take-up spin nut, a lock-up spin nut, and a let-out spin nut arranged between said other two spin nuts, each of said spin nuts carrying a thrust bearing thereon together with a bowed spring washer, a traction tube surrounding said spin nuts at one end and having slidable engagement with said pull rod tube at the other end, a trigger tube surrounding said traction tube at one end and having slidable engagement with said pull rod at the other end, a housing attached to the one end of said trigger tube and surrounding said threaded rod, a trigger spring arranged between the slidable end of said trigger tube and said traction tube, a let-out spring between the slidable end of said traction tube and said pull rod tube, both of said springs being around said pull rod tube, said let-out spin nut and said lock-up spin nut each having a peripheral clutching surface thereon, said take-up spin nut having two peripheral clutching surfaces thereon, a clutching surface on said housing and on said traction tube each normally engaging one of the clutching surfaces on said take-up spin nut, a clutching surface on said traction tube normally engaging the clutching surface on said let-out spin nut, a clutching surface on said traction tube normally engaging a clutching sleeve on said pull rod tube, and a clutching surface on said clutching sleeve normally spaced apart from the clutching surface on said lock-up spin nut, said bowed spring washers effective to control the action of their associated spin nuts, a plurality of push pins spaced apart in said traction tube and slidable back and forth therein, one end of said push pins being normally in engagement with said housing and the other end against a thrust bearing washer on said lock-up spin nut to hold its clutch surface apart from the clutch surface on said clutching sleeve, and means for causing said spin nuts, said traction tube and said trigger tube to revolve together around said threaded rod on slack let out, and means for rotating said spin nuts only around said threaded rod on slack take up.

4. In an automatic slack adjuster for railway car brakes, a pull rod tube connected to one portion of the braking system, a threaded rod arranged telescopically within said pull rod tube and connected to another portion of the braking system, a plurality of spin nuts arranged on said threaded rod for rotation thereon, said spin nuts comprising a take-up spin nut, a let-out spin nut and a lock-up spin nut, said let-out spin nut being located on said threaded rod between said other spin nuts, a clutching sleeve on one end of said pull rod, cooperative clutching surfaces between said clutching sleeve and said lock-up spin nut, a traction tube around said pull rod tube and said spin nuts, cooperative clutching surfaces between said traction tube and both said take-up and said let-out spin nuts, a trigger tube surrounding said pull rod tube, a housing around said threaded rod secured to said trigger tube, said housing having cooperative clutching surfaces with said take-up spin nut, a trigger spring between said trigger tube and said traction tube, a let-out spring between said traction tube and said clutching sleeve, both of said springs being around said pull rod tube, a plurality of push pins slidably extending through said traction tube and having one end in engagement with said housing and the other end with said lock-up spin nut, and means in response to a braking condition in which there is too much slack, for causing all of said spin nuts to revolve around said threaded rod in a direction to shorten the length of the slack adjuster, and means responsive to a braking condition in which there is insufficient slack, for causing all of said spin nuts to revolve around said threaded rod together with said traction tube and said trigger tube to let out slack.

5. The slack adjuster as claimed in claim 4 in which responsive to a condition of too much slack in the braking system, all of said spin nuts are caused to revolve on said threaded rod in a direction to telescope the rod into said pull rod tube, to shorten the length of the slack adjuster, and upon application of the brakes with the car wheels the slack adjuster is locked up by engagement of the clutch surfaces between said lock-up spin nut and said clutching sleeve, and responsive to the release of the brakes said push pins are effective to cause the disengagement of said lock-up spin nut from said clutching sleeve.

6. The slack adjuster as claimed in claim 4 in which responsive to a condition of insufficient slack in the braking system, all of said spin nuts are caused to revolve around said threaded rod and are locked to said clutching sleeve and traction tube so that said clutching sleeve along with said trigger tube all revolve together in a direction to lengthen the slack adjuster, and upon brake application to the car wheels the slack adjuster is locked up by engagement of the lock-up spin nut with the clutching sleeve, and upon brake release the push pins are arranged to disengage the lock-up spin nut from the clutching sleeve.

7. The slack adjuster as claimed in claim 4 in which the push pins extend through the traction tube at an angle and have one end normally in engagement with the housing and the other end engaging a thrust washer on the lock-up spin nut to normally hold said lock-up spin nut out of clutching engagement with said clutching sleeve, the push pins being arranged around the outside edge of said let-out spin nut, and between said take-up spin nut and said lock-up spin nut.

8. The slack adjuster as claimed in claim 4 in which each of said spin nuts are provided with thrust bearings and bowed spring washers to enable said spin nuts to properly rotate around said threaded rod under conditions of too much slack or insufficient slack and in which each of said spin nuts are provided with snap rings around their shank portions to hold the thrust bearings and bowed spring washers in position on said spin nuts.

9. In a double acting slack adjuster for railway car braking systems comprising a pull rod tube connected to one portion of the braking system and a threaded rod connected to another portion of the braking system, said threaded rod arranged in telescopic relation to said pull rod tube, a plurality of spin nuts arranged on said threaded rod including a take-up spin nut, a let-out spin nut and a lock-up spin nut, a clutching sleeve attached to said pull rod tube having clutching engagement with said lock-up spin nut, a traction sleeve having clutching engagement with said clutching sleeve, said let-out spin nut, and said take-up spin nut, a trigger tube surrounding said slack adjuster to enclose all of said operating elements, a housing on one end of said trigger tube having clutching engagement with said take-up spin nut, push pins slidably arranged through said traction sleeve and extending between said housing and said lock-up spin nut, a trigger spring between said trigger tube and said traction tube, a let-out spring between said traction tube and said clutching sleeve, a bowed spring washer on each of said spin nuts for normally urging said spin nuts into their associated clutching engagements, a keyway connection between said traction tube and said trigger tube, and means responsive to a condition of excessive slack in the braking system for causing said trigger tube to move inward and said spin nuts to rotate inward until all slack is taken up and the slack adjuster is locked up, and means responsive to a condition of insufficient slack in the braking system whereby said spin nuts are caused to rotate on said threaded rod outward together with said trigger tube and traction tube until sufficient slack has been let out and said slack adjuster is locked up.

10. The automatic double acting slack slack adjuster as claimed in claim 9 in which responsive to a condition of excess slack in the braking system, said trigger tube is activated to cause said take-up spin nut to be free to rotate outward while said let-out and lock-up spin nuts are prevented from rotating and with said threaded rod are held in locked position, and responsive to brake release said take-up spin nut is locked up and together with said threaded rod is shifted to take up the excess slack while said let-out and lock-up spin nuts are rotated inward on the threaded rod the amount of slack taken up.

11. The automatic double acting slack adjuster as claimed in claim 9 in which responsive to a condition of insufficient slack in the braking system, said let-out and lock-up spin nuts are locked up on said threaded rod, and upon the occurrence of a high compressive force the tension in said let-out spring is overcome whereby said let-out and lock-up spin nuts are rotated outward on said threaded rod together with said trigger tube and said traction tube, to let out slack, and upon said trigger tube being actuated said push pins are shifted to permit said lock-up spin nut to lock up the slack adjuster.

12. The automatic double acting slack adjuster as claimed in claim 9 in which in response to a condition of excess slack in the braking system, said take-up spin nut is caused to rotate outward on said threaded rod while said let-out and lock-up spin nuts and said threaded rod are held in locked position, and responsive to brake release said take-up spin nut is locked up and shifted inward with said threaded rod to take up the excess slack while said let-out and lock-up spin nuts are rotated outward to take up the excess slack, and responsive to a condition of insufficient slack said let-out and lock-up spin nuts are locked up on said threaded rod and upon the occurrence of a high compressive force the let-out spring tension is overcome so that said let-out and lock-up spin nuts are rotated outward on said threaded rod together with said trigger tube and traction tube to let out slack, and responsive to said trigger tube being activated, said push pins are shifted to permit said lock-up spin nut to lockup the slack adjuster.

13. In an automatic slack adjuster for railway car brakes, a tube connected to one portion of the brake rigging, a threaded rod telescopically positioned within said tube and connected to another portion of the brake rigging, a movable housing positioned about a portion of said tube and rod, a sleeve positioned within said housing, three spin nuts threadedly mounted on said rod and having clutch surfaces thereon for use in interconnecting said rod, housing, sleeve and tube, a let-out spring effective between said tube and sleeve, a trigger spring effective between said housing and sleeve, said rod being freely rotatable in said spin nuts for use in installing said slack adjuster, one of said spin nuts normally being biased into engagement with said housing, another of said spin nuts normally being biased into engagement with said sleeve, and said third spin nut normally being biased away from said sleeve.

14. The structure of claim 13 further characterized in that said one spin nut is normally in engagement with surfaces on said sleeve and housing.

15. The structure of claim 13 further characterized in that said third spin nut is in engagement with said sleeve when said slack adjuster is fully locked up upon application of the brakes.

16. The structure of claim 13 further characterized in that another of said spin nuts is positioned between the other two spin nuts.

17. The structure of claim 13 further characterized by and including spring means normally urging said one spin nut into engagement with a surface on said housing.

18. The structure of claim 13 further characterized by and including a connection between said sleeve and housing permitting relative axial movement, but preventing relative rotational movement between said members.

19. The structure of claim 13 further characterized by and including a plurality of clutch surfaces on said sleeve, there being a clutch surface on said sleeve arranged for engagement with each of said spin nuts.

* * * * *